Nov. 29, 1949     C. FINZER     2,489,279
DIRECTION FINDING SYSTEM
Filed Aug. 4, 1944
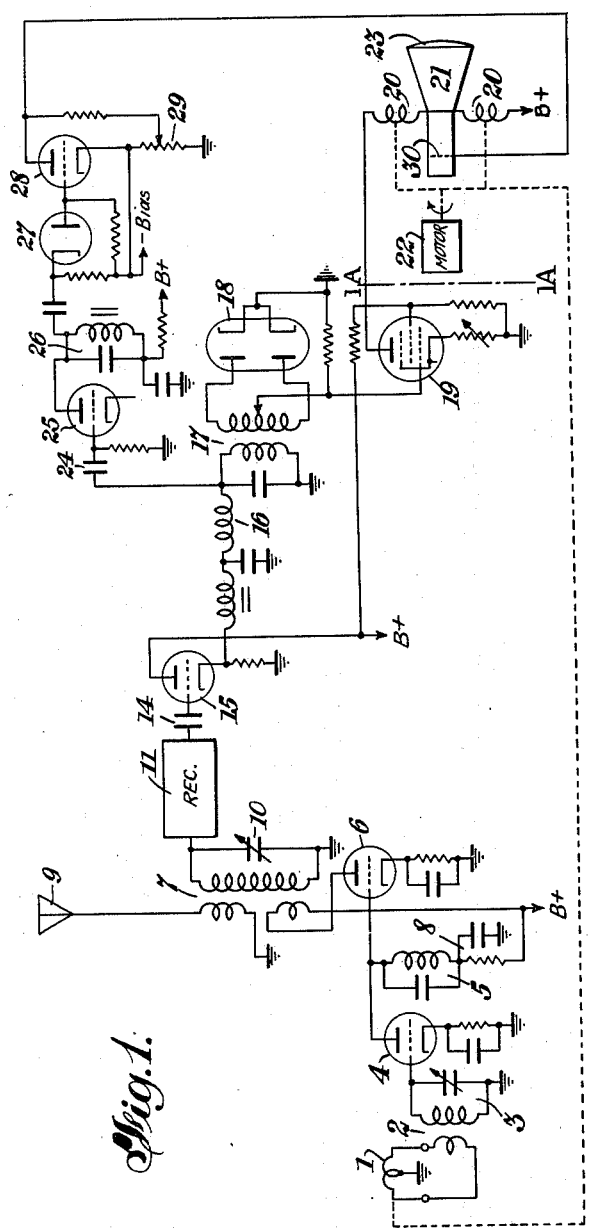
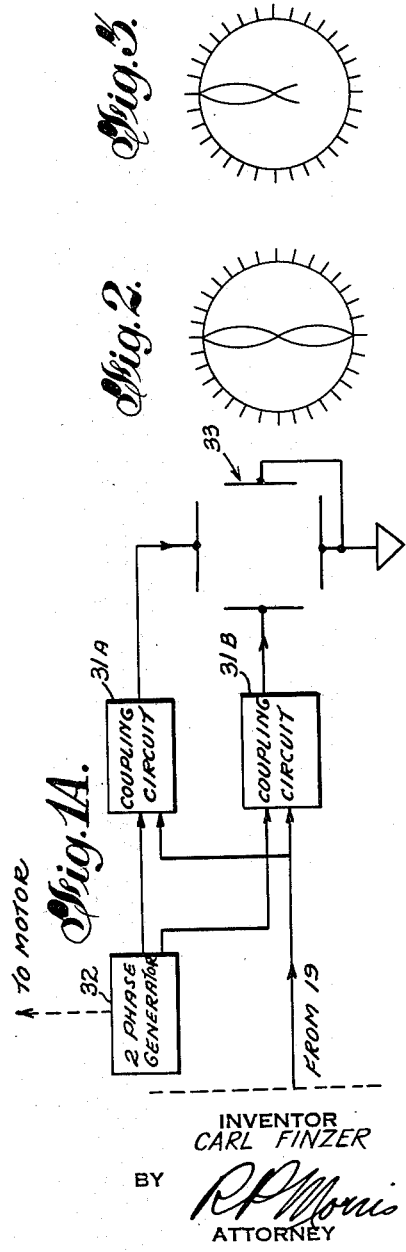
INVENTOR
CARL FINZER
BY
ATTORNEY Patented Nov. 29, 1949

2,489,279

UNITED STATES PATENT OFFICE 2,489,279

DIRECTION FINDING SYSTEM

Carl Finzer, Summit, N. J., assignor to Federal Telephone and Radio Corporation, New York, N. Y., a corporation of Delaware Application August 4, 1944, Serial No. 548,031

6 Claims. (Cl. 343—118)

This invention relates to bearing indication systems, and more particularly to a system which permits an almost instantaneous unidirectional bearing indication with a minimum of interferences whether it be caused by quadrature induction, high frequency modulation or any change in receiver characteristics.

The object of this invention is a bearing indication system comprising directional and nondirectional antennae. The directional antenna is rotated at a predetermined speed. The outputs of the two antennas in response to a signal, say of an unknown high frequency source, are combined, if necessary, after amplification and phase shifting. Thus, a resultant voltage is produced which has a modulation component of a frequency corresponding to the number of revolutions of the directional antenna and a phase depending upon the direction of the signal. This resultant, after suitable filtering, further detection and additional amplification, is rectified and applied to modulate the constant frequency voltage source in a measuring circuit such as the field circuit of a cathode ray tube which is controlled by a circle generator. Such a field circuit is used to effect the rotation of a cathode ray synchronously with the rotation of the directional antenna.

The resultant deviation from the circular pattern produced by the cathode ray on a fluorescent screen may be used as an immediate indication of direction.

The phase difference of the resultant voltage may also be used to measure the angle of direction with the aid of any other phase-indicating or comparing instrument or circuit, without exceeding the scope of the invention.

More specifically, the means used for rotating a loop or goniometer in synchronism with a circle generator for a cathode ray tube may consist either of deflection coils rotating about the cathode ray tube or of a two-phase generator which is connected to the plates of the tube.

The output of the rotating loop or goniometer is shifted 90° in phase in order to bring it in phase with a voltage from a non-directional sense antenna. The two voltages are then combined, the resultant voltage having a modulation component whose frequency is equal to the number of revolutions per second made by the goniometer or loop. The phase of the modulation component present in the resultant will depend upon the angle of arrival of the received signal.

The resultant voltage is amplified in the conventional manner and rectified, preferably at the second detector, thus producing an audio output which reproduces both the modulations which were imposed upon the signal at the transmitter and the modulations which are due to the rotating loop or goniometer. If the goniometer or loop is rotated at such a speed as to produce a low frequency modulation, the major portion of the program modulation may be removed by means of a low pass filter. The filler audio voltage is now rectified full wave and fed into a D. C. amplifier. The output of the D. C. amplifier either modulates the circle generator or is fed into the deflection coils which rotate about the cathode ray indicator. A figure-8 pattern whose angular displacement is proportional to the angle of arrival of the signal induced in the loop or goniometer coil system is produced on the screen of the cathode ray tube. The sharpness of the pattern is a function of the ratio maximum: minimum of the rectified audio voltage.

In order to obtain a purely unidirectional pattern, a portion of the audio voltage is taken off at the output of the low pass filter and shifted 90° in phase or order to bring one of the peaks in such a position as to block the reciprocal null. This may be done by passing the voltage through a half-wave rectifier and using the output to trigger-off the plate current of the cathode ray tube.

The principal advantages of the invention are as follows:

1. Bearing indication is instantaneous;
2. Bearing indication is unidirectional;
3. Quadrature voltages induced into the loop have a minimum of effect upon the sharpness of the pattern;
4. High frequency modulations are removed from the pattern;
5. The bearing does not shift with changes in receiver selectivity; and
6. The local modulation may be separated from the program modulation in the audio circuit.

The invention will be more fully explained by a reference to the drawings, in which:

Fig. 1 shows a circuit diagram of a voltage combination system which may be used to produce a resultant voltage to control a direction-measuring circuit;

Fig. 1a shows a circuit diagram of a modification of the arrangement of Fig. 1 employing a cathode ray oscilloscope having electrostatic deflection elements;

Fig. 2 illustrates a cathode ray pattern such as may be produced by a cathode ray tube used in accordance with this invention;

Fig. 3 illustrates a unidirectional type pattern produced with the arrangement of Fig. 1.

In Fig. 1, 1 represents a unidirectional antenna loop which is coupled over transformer 2 and tuning circuit 3 to the grid of an amplifier tube 4. The amplified signal, after having been shifted in phase by 90° by network 5, is fed to coupling tube 6 which separates the phase-shifting circuit from the voltage-combining circuit. The voltage thus obtained is applied to the primary winding of transformer 7. A filter circuit 8 couples the phase-shifting circuit to B+. A second primary winding of transformer 7 is connected to non-directional antenna 9.

The secondary winding of transformer 7, in shunt with a suitable tuning condenser 10, carries the combined voltages in their proper phase relationship, and the resulting voltage is fed into the input circuit of receiver 11. Phase-shifting circuit 5 may be removed. The resultant voltage would then be frequency-modulated instead of amplitude-modulated.

In order to obtain an elongated 8-shaped cathode ray pattern, as illustrated in Fig. 2, extending in the unknown direction of the signal received, the output of receiver 11 is applied, through condenser 14 to coupling or matching tube 15 and from there to the input of a low pass filter 16. Low pass filter 16 is arranged and designed to suppress the program modulations of a high frequency signal received and to pass only the frequency modulation corresponding to the rotation of antenna loop 1.

The output of filter 16 is fed through transformer 17 to full-wave rectifier 18; the rectifier output is amplified in a D. C. amplifier consisting of pentode 19. The anode circuit of pentode 19 supplies the two deflection coils 20 of cathode ray tube or radio goniometer 21. Coils 20 are rotated (as indicated by the dotted line connection) by motor 22 at a speed synchronous with that of antenna loop 1; the result is a circular pattern on screen 23 of tube 21.

Instead of controlling the electronic beam of a cathode ray tube electromagnetically, electrostatic control may be provided by using deflection plates in a cathode ray tube 33, as shown in Fig. 1a. The output of a two phase frequency generator 32 and the output of pentode 19 are simultaneously fed through coupling circuits 31a and 31b to the respective plates of the cathode ray tube. This method of modulating the receiver output with a sine and cosine voltage and for applying the modulated outputs to separate sets of deflection plates of a cathode ray tube is well known.

In order to derive a purely uni-directional pattern such as is shown in Fig. 3 a portion of the output of filter 16 is fed through condenser 24 to a phase-shifting tube 25. The output of this tube, after having passed phase-shifting network 26 is applied to a half-wave rectifier 27 and, after amplification in trigger tube 28, it is applied to the grid 30 of cathode ray tube 21 to trigger-off its plate current at the appropriate moments. An adjustable resistance 29 serves to regulate this trigger effect.

The following considerations may help to explain some of the effects of the invention.

Since it can be shown that the output of a rotating goniometer search coil is the same as the output of a rotating loop, it shall be understood that the term "rotating loop" also covers the rotating goniometer.

The equation of the output of a loop rotating in an electric field can be written as (1) $\quad e = E \cos \omega t \sin \omega_1 t$ where $e$ is the instantaneous amplitude.

$E$ is the maximum amplitude of the induced voltage.

$\omega$ is $2\pi$ times the frequency of the induced voltage.

$\omega_1$ is $2\pi$ times the frequency of rotation of the loop.

If the movement of the rotating spot producing the circle on the screen of the cathode ray tube, and the loop are synchronized, Equation 1 can be rewritten as (2) $\quad e = E \cos \omega t \sin(\omega_1 t + \theta)$ where $\theta$ is the angular relation between the angle of arrival of the induced voltage in the loop and an arbitrary point on the circle traced on the cathode ray tube.

The R. F. output voltage of the loop is shifted 90° in phase in order to bring it in phase with the sense voltage and the two voltages are combined as shown in Fig. 1. The equation of the resultant voltage can be written as (3) $\quad e_1 = E \sin \omega t \sin(\omega_1 t + \theta) + E_1 \sin \omega t$ where $E_1$ is the maximum amplitude of the voltage induced in the sense antenna. $E_1 \sin \omega t$ is the output of the sense antenna.

If $E$ and $E_1$ are made equal, Equation 3 can be rewritten as (4) $\quad e_r = E_2[\sin \omega t \sin(\omega_1 t + \theta) + \sin \omega t]$ where $E_2 = E = E_1$.

It can be shown that Equation 4 represents a carrier having a maximum instantaneous value of $E_2$, a frequency of $$\frac{\omega}{2\pi}$$

a modulation frequency of $$\frac{\omega_1}{2\pi}$$

and the modulation factor of 1, by substituting the values of Equation 4 into Equation 5 which is the general equation of a carrier with a simple sinusoidal modulation.

(5) $\quad e = E_0(1 + m \sin 2\pi f_m t) \sin 2\pi f t$ where $E_0$ represents the maximum instantaneous amplitude of the carrier $m$ the modulation factor
$f_m$ the modulating frequency
$f$ the carrier frequency.

The resultant voltage is amplified and detected in the conventional manner. The A. C. component of the output voltage of the second detector can be written as (6) $\quad e_d = E_d \sin(\omega_1 t + \theta)$ where $E_d$ is the maximum amplitude of the A. C. component of the detected output voltage.

The voltage $e_d$ is filtered to exclude modulations originating at the transmitter, and rectified by means of a full-wave rectifier (see Fig. 3). The output of the rectifier is fed to the grid of a D. C. amplifier which modulates the circle on the cathode ray tube in such a manner as to drive the spot to the center of the tube on the peaks of the rectifier output. The pattern produced on the tube is shown in Fig. 2.

From Equation 2 it can be seen that the angular displacement of the pattern will be a function of the angle of arrival of the voltage induced in the loop.

The definition or the sharpness of the pattern can be expressed as a function of the ratio of $$\frac{E \text{ max.}}{E \text{ min.}}$$

of the voltage E at the output of the rectifier.

By examining Equation 3 it can be seen that quadrature voltages induced in the loop by re-radiation etc. will have no effect on the sharpness of the pattern since they will be out of phase with $E_1$ and produce no amplitude modulations.

The ambiguity of the pattern shown in Fig. 2 is eliminated by shifting the voltage at the output of the low pass filter 90° in phase and passing it through a half-wave rectifier. The output of the rectifier is used to drive the cathode ray tube to cut-off during the undesired half of the pattern (Fig. 2), producing a unidirectional bearing indication as shown in Fig. 3.

In order to eliminate errors due to phase shift in the low pass filter, the speed of rotation of the loop must be held constant.

The bearing will not shift with changes in the selectivity of the receiver.

What is claimed is:

1. In a combination receiving means including directional and non-directional antenna systems both arranged to receive a signal simultaneously from an unknown direction and each arranged to provide a voltage corresponding to said signal, a cathode ray tube including control electrodes and cathode ray deflecting means for rotating said directional antenna system, means for controlling said deflecting means for deflecting said cathode ray synchronously with said rotation, means for providing a phase shift between said voltages, means for combining said voltages after said phase shift, filter means, means for passing said combined voltages through said filter means for obtaining the modulation components corresponding to the rotation of said directional antenna system, means for providing two separate outputs of said modulation components, a full wave rectifier, means for applying one of said outputs through said full wave rectifier to said deflecting means, means for providing a phase shift of said other output, a half wave rectifier, means for applying said other output after said phase shift through said half wave rectifier and provide a rectified output wave and means for applying said latter rectified output wave to said control electrodes of said cathode ray tube.

2. Arrangement as set forth in claim 1, wherein said first phase shift comprises 90° and said second phase shift is of a value to eliminate sense ambiguity of the resultant reception pattern.

3. A combination according to claim 1, in which said deflecting means include electrostatic deflecting means and a two-phase oscillator controlling electrostatically the cathode ray.

4. A combination according to claim 1, in which said deflecting means include coils rotating to control electromagnetically the cathode ray.

5. A combination according to claim 1, comprising means for shifting the phase of at least one of said voltages to be in phase with the other.

6. A combination according to claim 1, in which the number of revolutions of the directional antenna system is such as to produce a frequency modulation having a major part below the frequency modulation range of the signal.

CARL FINZER.

REFERENCES CITED

The following references are of record in the file of this patent:

UNITED STATES PATENTS

| Number | Name | Date |
| --- | --- | --- |
| 2,183,746 | Hyland | Dec. 19, 1939 |
| 2,263,377 | Busignies et al. | Nov. 18, 1941 |
| 2,295,412 | Little | Sept. 8, 1942 |
| 2,388,262 | Ganiayre | Nov. 6, 1945 |
| 2,403,967 | Busignies | July 16, 1946 |
| 2,406,406 | Sandretto | Aug. 27, 1946 |
| 2,406,800 | Busignies | Sept. 3, 1946 |

FOREIGN PATENTS

| Number | Country | Date |
| --- | --- | --- |
| 468,918 | Great Britain | July 15, 1937 |